(12) United States Patent
Baumann

(10) Patent No.: US 6,776,388 B2
(45) Date of Patent: Aug. 17, 2004

(54) VALVE ACTUATOR WITH INTERNAL AMPLIFYING MEANS

(76) Inventor: Hans D. Baumann, 32 Pine St., Rye, NH (US) 03870

(*) Notice: Subject to any disclaimer, the term of this patent is extended or adjusted under 35 U.S.C. 154(b) by 128 days.

(21) Appl. No.: 10/259,990

(22) Filed: Sep. 30, 2002

(65) Prior Publication Data

US 2004/0061084 A1 Apr. 1, 2004

(51) Int. Cl.[7] .................. F16K 31/145; F16K 31/165; F16K 31/365; F16K 31/385
(52) U.S. Cl. ................. 251/61.4; 251/238; 251/244
(58) Field of Search ................ 251/58, 61, 61.2, 251/61.4, 238, 242, 244; 137/625.33

(56) References Cited

U.S. PATENT DOCUMENTS

| 3,955,591 | A | * | 5/1976 | Baumann | ............... 137/270 |
| 4,684,103 | A | * | 8/1987 | Baumann | ............... 251/58 |
| 5,253,671 | A | * | 10/1993 | Kolenc | ............... 137/315.05 |
| 5,346,172 | A | * | 9/1994 | Gonsior | ............... 251/58 |
| 5,931,188 | A | * | 8/1999 | Sprague | ............... 137/505.18 |

* cited by examiner

Primary Examiner—Edward K. Look
Assistant Examiner—John K. Fristoe, Jr.

(57) ABSTRACT

A Valve actuator with integral amplifying means having multiple linkage arrangements able to amplify the force generated by an air signal acting on a flexible diaphragm, and to transmit this force amplified on to a lower compression spring and ultimately on to a sliding actuator stem.

9 Claims, 2 Drawing Sheets

VALVE ACTUATOR WITH INTERNAL AMPLIFYING MEANS

BACKGROUND OF THE INVENTION

It is common to employ actuators powered by pneumatic signals in order to move the internal trim of modulating type control valves. Such valves are utilized in process plants in order to control the pressure, temperature, or mixture of certain fluids in a closed-loop control system.

It is very important for the stability of such loops that there is very little dead-time, that is any response of a control valve to an up-set in the system should ideally be instantaneous. To that end, it is vital that friction forces either in the actuator, or in the valve itself, are kept to a minimum. The reason is that it takes a certain time for a pneumatic signal to change enough in order to overcome such friction forces. This in turn generated dead-time and causes loop instability.

There is a certain valve type on the market called a sliding gate valve. Such a valve is more closely described in my U.S. Pat. No. 3,955,591.

Such a valve type offers certain advantages such as compactness, low weight, reduced cost, a higher flow capacity, and a lower noise level. The major drawback is that the trim element consist of two slotted plates that have to slide against each other, thereby selectively exposing slots to fluid flow (see drawing FIG. 1). This sliding motion generates a good amount of friction. Present means to overcome such friction range from using piston actuators utilizing high air pressure, or, to use oversized pneumatic diaphragm actuators. Either of these solutions negate a good part of the cost advantage of the valve itself. One other problem with large actuators is that they are designed for relatively large travels. Yet, the travel requirements of sliding gate valves are very small, hardly exceeding the width of a slot within the sliding plate. The necessary use of only a small fraction of the available actuator travel again leads to a loss of positioning accuracy of the complete valve system.

There is therefore a need for a small and compact pneumatic actuator that has a high output force of a heretofore much larger actuator in order to overcome the aforementioned friction problem.

The present invention overcomes these problems by providing a small and compact actuating device that is able to amplify the force generated by an air signal acting on a diaphragm by typically three times, while at the same time reducing the normal travel of the diaphragm by a like ratio, thus meeting the exact requirements of such sliding gate valves.

Internal force amplification for valves and valve actuating devices have been used before. Typical devices are described in my U.S. Pat. Nos. 4,609,178 and 4,684,103.

U.S. Pat. No. 4,609,178 for example describes means to amplify the force of a valve stem within the valve itself. Here a wedge is used to drive a pair of ball bearings apart leading to a like motion of a second pair of bearings mounted on fulcrumed linkages. Such a system would not be workable for my intended purposes since the wedge exerts only a unilateral force to overcome reaction forces by fluid pressures acting on a diaphragm. In addition, there is no space within a sliding gate valve to incorporate an amplifying device as described herein. My U.S. Pat. No. 4,684,103 is very similar in nature. U.S. Pat. No. 4,684,103 describes again a bearing and fulcrum linkage device opposing fluid forces acting on a diaphragm. Here the actuator and valve are combined, a method not suitable for my purpose. Note also the absence of a secondary coiled spring providing sufficient force to oppose the force created by a pneumatic signal acting on a flexible diaphragm taught in my invention.

My invention does provide for a separate and dismountable actuating device with internal amplifying mechanism that is not only compact and of low cost, but one that also provides ample force amplification at a high degree of mechanical efficiency, as can be seen from the following description.

DESCRIPTION OF THE INVENTION

Figure 1:
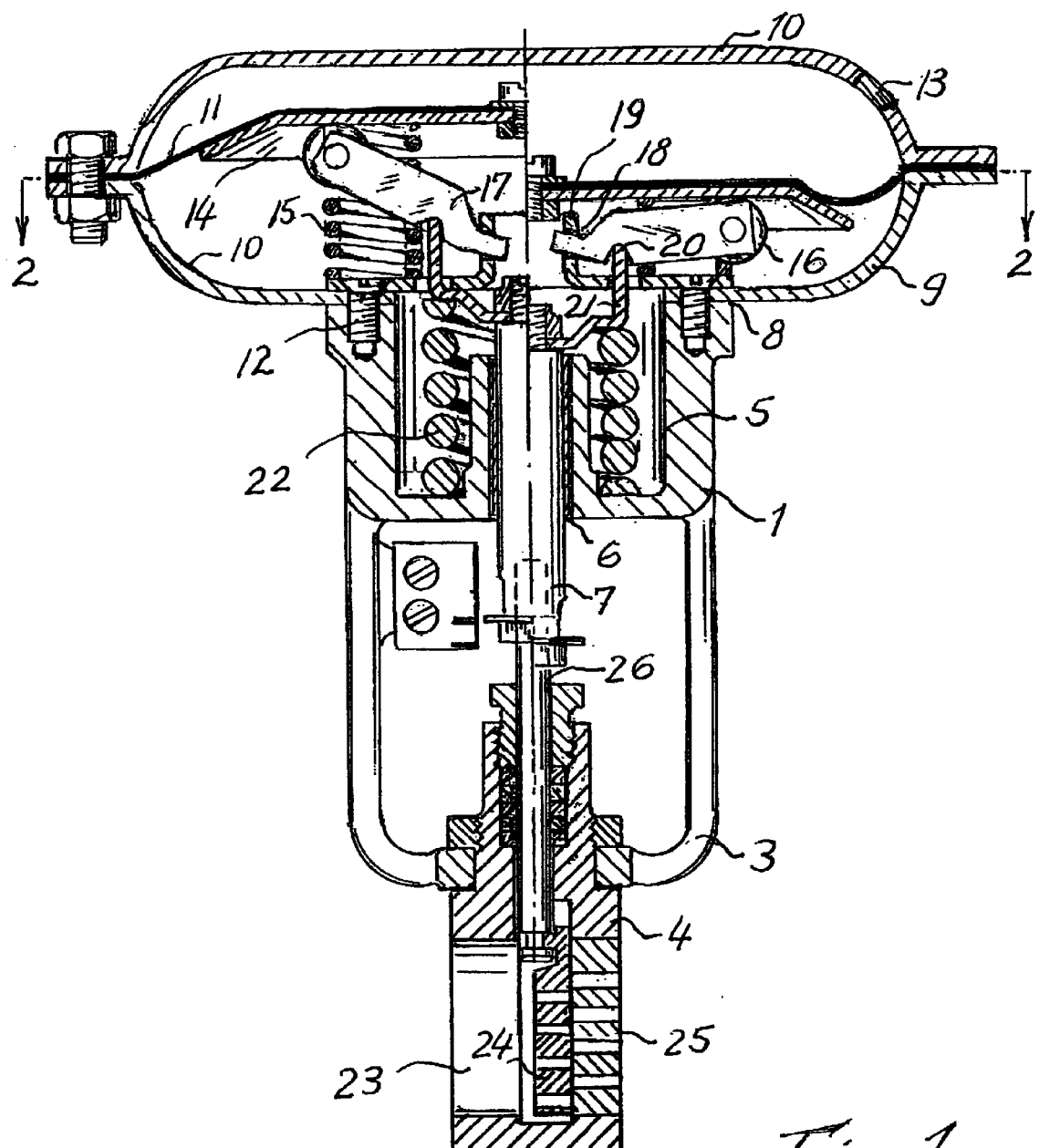
FIG. 1 is a vertical, central, cross-sectional view of a preferred embodiment of my invention in which the actuating device is mounted on a sliding gate valve (not part of my invention), and where the left half of the valve actuator is shown in the uppermost travel position while the right half is shown in the lowest travel position.
Figure 2:
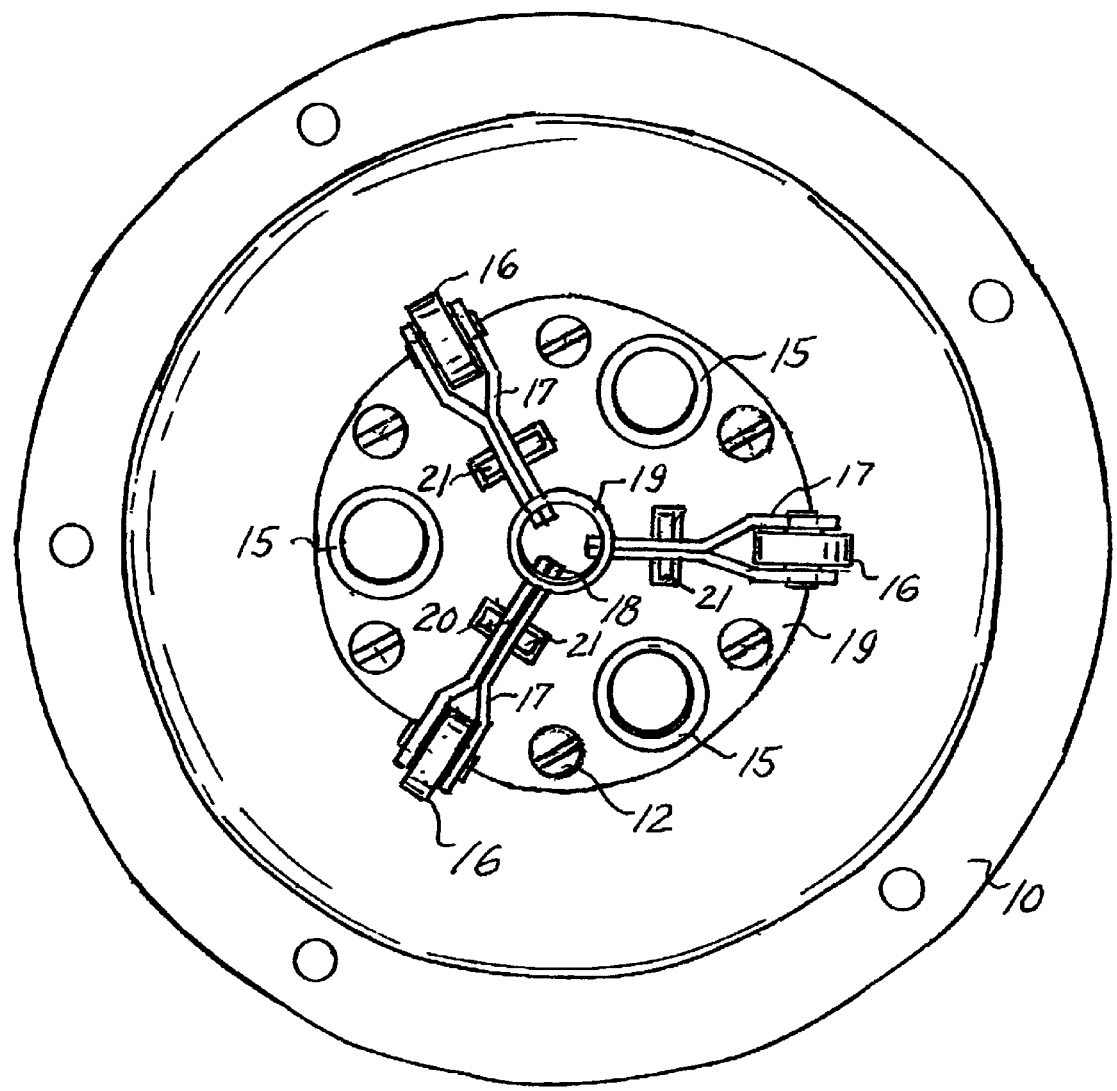
FIG. 2 is a top, plan view showing a portion of my preferred embodiment along the lines 2—2 in FIG. 1 with the flexible diaphragm and the movable plate omitted for clarity.

While the invention will be described in connection with the preferred embodiment, it will be understood that it is not intended to limit the invention to this specific design. Referring to FIG. 1, an actuating device 1 is shown having a lower yoke 3 which is suitably connected to valve 4 which is not part of my invention.

The yoke 3 has a concave extension 5 also having a central bore 6 engaging therein a sliding stem 7. Said yoke furthermore has a terminating end 8 to which an actuator case 9, comprising two diaphragm cases 10 and a flexible diaphragm 11, is fastened at 12. A pneumatic signal can be admitted through opening 13 capable of pressurizing diaphragm 11. This diaphragm is supported by a movable plate 14 that is supported by a number of upper, coiled compression springs 15. Whenever the pneumatic signal on top of the flexible diaphragm 11 creates sufficient force to overcome the combined force of the upper, coiled compression springs 15, the movable plate 14 will move downwards as shown on the right hand side of FIG. 1. Such downward motion is sensed by a number of bearings 16 being connected to one end of linkages 17 (three are shown here). The opposing ends of linkages 17 have a reduced cross-section and tiltingly engage suitable openings 18, part of retaining flange 19, the latter being fastened to said upper terminating end 8 of yoke 3. Linkages 17 furthermore incorporate lower notched recesses 20, engaging a thinned portion of a fulcrum member 21. This fulcrum member is suitably fastened to the sliding stem 7 and furthermore has a lower shoulder that is able to compress a lower, coiled compression spring 22.

In a typical preferred embodiment, the movable plate travels ¾ inch from the top to the lowest portion of the travel. With the distance between opening 18 and the notched recess 20 being one third of the overall effective lenth of linkages 17, fulcrum member 21 will now move only ¼ inch. Such motion is transmitted to the sliding stem 7 and ultimately to valve 4.

It can also be stipulated that the pneumatic signal has a range of 3–15 psi. With an assumed diaphragm area of 25 square inches, the resultant downward force on movable plate 14 will be 75 to 375 pounds. In order to keep the force acting on the linkage elements low for strength considerations and reasons of friction, my preferred invention uses a set of upper springs 15 that absorb about one halve of the above force. The desired spring rate of upper springs 15 should therefore be $(375-75)/2 \times 0.75 = 200$ pounds per inch.

It follows that the remaining force of 37.5 to 187.5 pounds has to be absorbed by the amplifying linkage mechanism. With a three to one advantage, the resultant force acting on fulcrum member 21 is now 112.5 to 562.5 pounds. This makes the required spring rate of the lower, coiled compression spring 22, $(562.5-112.5)/0.25 = 1800$ pounds per inch.

In order to fully understand the advantages of my invention let us assumne that valve 4 is a 2 inch size sliding gate valve. Here fluid enters from 23 and exerts a pressure on a sliding plate 24 which is then pressed against a stationary plate 25. The sliding plate 24 furthermore is connected to a valve stem 26, which in turn connects to sliding stem 7. In order for my actuating device 1 to move the sliding plate 24, it has to overcome friction forces generated between plates 24 and 25. For example, for a fluid pressure of 100 pounds per square inch at 23, a plate area of 1.5 square inches, and a coefficient of friction of 0.35, the total friction forces will be $100 \times 1.5 \times 0.35 = 52.5$ pounds. A conventional actuator with ¼ inch travel will produce $(15-3) \times 25 = 300$ pounds of force. The valve friction alone will therefore absorb $100 \times 52.5/300 = 17.5\%$ of the actuator force output. In contrast, my actuator having three times the force output acting on sliding stem 7 will only have 5.8% friction, which is in the tolerable range of a control loop.

Having thus described the features and advantages of my invention, I hereby claim the following:

1. A valve actuator with internal amplifying means, comprising a yoke having an upper concave extension with a central bore there through and furthermore having a terminating end, an actuator case suitably connected to said terminating end and containing therein a movable plate, an actuator stem slidingly engaged within said central bore of the yoke and wherein said upper concave extension encloses lower spring means, said amplifying means capable to change the ratio of motion between that of the movable plate and that of the sliding actuator stem.

2. A valve actuator with internal amplifying means as claim 1, wherein said amplifying means comprise at least two linkages having attached bearings capable of following any axial motion of said movable plate, a fulcrum member capable of being displaced by a portion of said linkages and being connected to said sliding actuator stem.

3. A valve actuator with internal amplifying means as claim 1, wherein said actuator case enclosed at least two upper compression springs capable of being compressed by said movable plate.

4. A valve actuator with internal amplifying means as claim 2, wherein said fulcrum member is capable of compressing said spring means.

5. A valve actuator with internal amplifying means as claim 2, wherein said linkages have a thinned, terminating end portion opposed to said bearings and tiltingly engaging suitable openings in a retaining flange.

6. A valve actuator with internal amplifying means as in claim 1, wherein said yoke is capable of being coupled to a valve.

7. A valve actuator with internal amplifying means as in claim 3, wherein said lower spring means comprises at least one coiled compression spring having a load carrying capacity substantially higher than each of said upper compression springs.

8. A valve actuator with internal amplifying means as claim 7, where the ratio of deflection between the upper and the lower compression springs is at least two to one.

9. A valve actuator with internal amplifying means as claim 1, wherein said actuator case consists of two diaphragm cases separated by a flexible diaphragm, the latter being centrally supported by said movable plate.

\* \* \* \* \*